United States Patent Office
3,328,253
Patented June 27, 1967

1

2

3,328,253

PROCESS FOR THE PRODUCTION AND PURIFICATION OF OGAWA LIPOPOLYSACCHARIDE CHOLERA ANTIGEN

Yoshikazu Watanabe, Geneva, Switzerland, assignor to the United States of America as represented by the Secretary of the Department of Health, Education, and Welfare No Drawing. Filed Apr. 15, 1965, Ser. No. 448,544
4 Claims. (Cl. 167—78)

This application for patent is filed under the provisions of the Comptroller General's Opinions B–111,648 and B–117,352 and an assignment of all right, title and interest in the present invention and application to the Government of the United States is of record herewith.

This invention relates to process for the preparation and purification of Ogawa lipopolysaccharide chlorea antigen.

Vaccines for immunization against cholera have been used for many years. These consist of whole cells that have been killed by heat or chemicals, or the lysates of such cells without appreciable purification. Cholera vaccines, when injected, produce considerable local and systemic toxicity and, in the doses that can be employed without excessive toxicity, have been found to be equivocal in their effectiveness.

Cholera has not occurred in the United States for many years and chlorea immunization is not practiced in this country. However, since this disease is of major importance in many other parts of the world, travelers from this country, including members of the Government and the Armed Forces, do receive cholera immunization. Since cholera is caused by two different groups of cholera organisms that are antigenically related but not identical, classical vaccines contain organisms of both types. The present processes are applicable to only one of these, namely, the Ogawa subtype and is not suitable for the Inaba subtype. The present processes, therefore, produce one of two components that would be needed for a purified antigen for practical use in humans.

In foreign countries such as India, Pakistan, Indonesia, and China, cholera is an exceedingly serious epidemic and endemic disease with high mortality. Epidemics have occurred in the Philippines within the last two years, which resulted in temporary limitations on travel to the United States from this area. Immunization is considered as being the major feasible way to control this disease in areas having generally poor sanitation.

It is therefore the object of the present invention to provide novel processes for the production and purification of a practical Ogawa lipopolysaccharide cholera antigen which has been found to protect mice against experimental challenge with Ogawa subtype cholera organisms at doses below a tenth of a microgram and which when injected into humans in doses of 25 to 50 micrograms has produced excellent vibriocidal antibody titer and only slight evidences of any toxic reaction compared to ordinary vaccines.

Another object of the present invention is to provide processes for the production and purification of such an antigen providing one of the active components of cholera vaccine in doses that are larger and more effective than can be given using classical vaccines.

Other objects of this invention will appear from the following description of illustrative embodiments thereof.

Generally speaking, the processes of the present invention comprise a series of steps in which an Ogawa El Tor subtype Vibrio is grown in a liquid bacteriological culture medium at 30–32° C. for 20 hours. The organisms are removed by centrifugation and the supernatant liquid containing "grossly impure" antigen is obtained. This material is the starting material for the present processes and produce an immunizing substance that is active in the immunization of animals and/or humans against cholera infection caused by the Ogawa subtype of the El Tor vibrios and *Vibrio comma*, and is free of many of the impurities that may be both useless and toxic that occur in the original culture supernatants or in whole cell cholera vaccines made by classical methods. The first two steps of purification consist of ammonium sulfate prepicitation at 0.65 saturation and at 0.3 saturation. The second ammonium sulfate precipitate, after dialysis against distilled water, is freeze-dried and treated with a phenol-water mixture (1:1 by weight) on the basis of 10 mg. of lyophilized solid for each gram of phenol-water mixture. After heating at 62° C. for 10 minutes the mixture is centrifuged in cold, and the water layer containing the active antigen is recovered and dialyzed. The dried material is then extracted with a 2:1 by volume mixture of cholorform and methanol. One ml. of the cholorform-methanol mixture is used for every 2 mg. of lophilized solids, and the suspension is extracted at −60° for 24 hr., −25° for 24 hr., and at room temperature for 18 hours. The insoluble material following this extraction and subsequent drying is the purified immunizing agent.

At this stage of purity, ultracentrifugal analysis shows a major component with a small amount of a heavier impurity and Ouchterlony gel diffusion analysis indicates the presence of two components. Since the ammonium sulfate precipitate contained at least seven antigens by Ouchterlony gel diffusion analysis, and the original culture supernatant was highly complex by both immunologic and biochemical standards, this material has undergone a very considerable degree of purification.

Subsequent steps using ethanol fractionation produce an antigen that appears to be completely homogeneous by ultracentrifugal analysis and demonstrate only a single band in the Ouchterlony immunodiffusion test. However, the losses that occur in this subsequent treatment are very large, and while the completely purified material is of scientific interest, it may not be feasible as a practical material for human immunization. Further purification beyond the chloroform-methanol stage does not result in any measurable decrease in toxicity.

Preferred processes according to the present invention may be described as follows:

(I) *Production organisms used*

(A) *Vibrio cholerae* El Tor 17 Ogawa.
(B) *V. cholerae* Ogawa 41.

These strains have been used. Any smooth *V. cholerae* strain of the Ogawa subtype could be used.

(II) *Culture medium*

A liquid culture medium having the composition listed below has been employed, which yields a total mix of 15 liters.

| | | | |
|---|---|---|---|
| (A) | Tryptone | g | 150. |
| | Casitone | g | 150. |
| | $MGSO_4$ | g | 1.5 |
| | NaCL | g | 75. |
| | Glycerol | ml | 45 |
| | $Na_2HPO_4\cdot 7H_2O$ | g | 75. |
| | $KH_2PO$ | g | 25.5 |

The salts are dissolved first in distilled water and then added. The container in which glycerol is measured is washed with the media to be sure all of it is removed. Adjustment of pH is 9.0. The mixture is dispensed into Roux bottles, 250 ml./bottle, and autoclaved at 15 lbs. for 15 minutes. The culture medium composition can be varied widely, and the lipopolysaccharide antigen will still be produced. Any culture medium that is liquid rather than solid and which causes the organisms to produce the mouse-protective antigen is probably suitable for growing the organisms.

(III) *Inoculation and growth conditions*

One loopful of growth of the El Tor 17 strain from heart infusion agar is deposited on the wall of each Roux bottle near the air-liquid interface. The bottles are incubated in a horizontal position at 30–32° C. for 20 hours. During incubation the organisms form a smooth pellicle over the entire surface of the medium. Cultures where pellicle formation does not occur have their antigen yield sharply curtailed but not completely eliminated. Temperatures from 28–37° C. have been employed. Strains, culture conditions and culture media are ways of producing the antigen in its natural crude form. The process of purification is important. Any procedure which does not interfere with purification may be used for obtaining the starting material.

(IV) *Purification procedure*

(A) After culture incubation, the Roux bottles are examined for purity, and all pure cultures are pooled. The combined culture suspension is centrifuged at 6–8,000×*g* at 0° C. for 20 minutes. The volume of the clear culture supernatant is then measured. All subsequent steps, except those specifically mentioned, are carried out under refrigerated conditions.

(B) Ammonium sulfate is added to a final concentration of 50% (w./v.), and the pH is kept between 6.8 and 7 by the addition of either sodium hydroxide or hydrochloric acid. The batch is held overnight at 2° C., and the material which flocculates and floats to the surface is collected and packed by centrifugation at 10,400×*g* for 10 minutes. The precipitate is then dissolved in 0.005 M phosphate buffer solution, pH 7.2, containing 0.0001 M EDTA. This solution is then dialyzed against this same buffer for 3 days in the cold. Any precipitate which forms is removed by centrifugation at 10,400×*g* for 30 minutes. The protein content of the supernatant fluid is adjusted to 4 mg./ml., and ammonium sulfate is added to the final concentration of 40% (w./v.). After standing 30 minutes at 0° C., the precipitate is collected by centrifugation at 6–8,000 *g* for 20 minutes.

(C) The packed precipitate is again dissolved in phosphate buffer containing EDTA and dialyzed overnight in the cold against this same buffer. The volume of the dialyzed solution is measured, and a 10% lactose solution is added to produce a final concentration of 1% lactose. The lactose-containing, ammonium sulfate precipitated antigen is then freeze-dried and stored under refrigerated conditions. At this step, multiple lots of material can be pooled in the dry state for subsequent purification procedures.

(D) *Phenol-water extraction*

A 50% (w./w.) mixture of phenol and distilled water is prepared. For each 10 mg. of the ammonium sulfate precipitate, 1 g. of the phenol-water mixture is heated to 62° in a water bath. The ammonium sulfate precipitate is then added to the mixture, and heating with slow stirring is continued for 10 minutes. The mixture is then centrifuged at 10,400×*g* at 8° C. for 30 minutes. During centrifugation the phenol-water mixture separates into two phases. The upper (water) layer is pipetted off. This material is dialyzed for 72 hours against cold distilled water in an ice bath. After dialysis a sample is removed for total solids determination. The volume is measured, and 10% lactose solution is added to a final concentration of 1%. The lactose-containing antigen is then freeze-dried.

(E) *Chloroform-methanol treatment*

Chloroform and methanol are cooled to −60° C. and are mixed in a ratio of 2:1 (v./v.). One ml. of this mixture is added to each 2 mg. of antigen based upon the dry weight determined on the dialyzed material before freeze-drying. The suspension is held at −60° C. for 24 hours and is then moved to −25° C. for another 24 hours before being placed at room temperature for 18 hours. While at room temperature, it is stirred slowly by means of a magnetic stirrer. The mixture is then centrifuged at 17,000×*g* at 0° C. for 60 minutes, and the chloroform-methanol extract is removed by decantation. This extract may be discarded. The sediment is taken up in cold distilled water, using 1 ml. of water for each 20 mg. of the phenol-water treated material which has been extracted with chloroform-methanol. The distilled water preparation is then dialyzed against cold distilled water in an ice bath for 72 hours and centrifuged at 23,000×*g* at 0° C. for 30 minutes. The water supernatant is collected, its volume is determined, and a sample is collected, its volume is determined, and a sample is removed for total solids determination. Ten percent lactose is again added to a final concentration of 1%. At this point the antigen may be finished for preparation of the so-called "practical antigen." This is done by diluting the material with 1% lactose solution to the desired antigen-solids concentration (0.5 mg./ml. has been prepared routinely). For practical antigen this diluted solution is filtered through a Selas bacteria-proof filter (porosity 02) and filled aseptically into final containers. These containers are freeze-dried and sealed under vacuum. After testing for sterility, safety and potency as prescribed by the National Institutes of Health for cholera vaccine, it is considered that the process is finished for the preparation of practical antigen. If the material is to be carried on for the preparation of purified antigen, the material is not further diluted with 1% lactose but is freeze-dried in a single container in its concentrated form for subsequent further purification by ethanol fractionation.

(F) *Ethanol fractionation*

The solid material obtained in the previous step is dissolved in cold distilled water to a concentration of 2 mg./ml. and is kept overnight in the refrigerator at 2° C. Sodium chloride is added to a final concentration of 25% (w./v.) while cooling the solution in an ice-salt bath to −15° C. Absolute ethanol, previously chilled to −60° C., is slowly added to a final volume of 30% (v./v.) with constant stirring. After standing for 30 minutes at −15° C., the mixture is centrifuged at 12,000×*g* at −15° C. for 10 minutes. The collected precipitate is discarded, and more chilled ethanol is added to the supernatant to a final concentration of 60% (v./v.) After standing for 30 minutes at −15° C., the mixture is again centrifuged as described immediately above. The alcohol-containing supernatant is removed by decantation, and the precipitate is dissolved in cold distilled water and dialyzed against distilled water in an ice bath for 24 hours. A sample is removed for total solids determination, and final volume is measured. Ten percent lactose solution is added to a final concentration of 1%, and additional 1% lactose is added to produce an antigen concentration that is somewhat greater than the final antigen concentration that is desired for filling into the final containers. This is done so that the antigen concentration can be adjusted to the desired concentration following any losses that may occur in filtration. The antigen solution containing 1% lactose is filtered through a Selas bacterial-proof filter (02 porosity) to produce sterile material. A 5 ml. sample is taken for dialysis against distilled water and subsequent determination of total solids, and the filtrate volume is determined. On the basis of total solids determined on the filtered and dialyzed sample, the amount of additional sterile 1% lactose solution to be added is calculated based upon the desired antigen concentration to be filled (usually 0.5 mg./ml.). This additional sterile lactose solution is added under aseptic conditions, and the antigen solution is filled aseptically into final containers for freeze-drying. The freeze-dried material is sealed under vacuum, and it is considered to be finished as purified antigen after the successful completion of suitable tests for sterility, safety and potency as specified by the National Institutes of Health for cholera vaccine.

The sedimentation pattern of the purified antigen was determined in a Spinco Model E analytical centrifuge. The lyophilized material was dissolved in distilled water and equilibrated by dialysis with 0.1 M tris buffer, pH 8.0 for 72 hours at 8° C. The concentration of the dialyzed material was adjusted to 0.75% with the same buffer solution. Schlieren patterns photographed at 8-minute intervals at 29,500 r.p.m. were used for the calculation of the sedimentation coefficient.

Paper electrophoresis was performed, using cellulose acetate strips. The separations were carried out in barbitone buffer, pH 8.6, at an ionic strength of 0.05 with a constant current of 0.48 ma. per cm. for 7 hours. The development of protein was done by staining the strips with nigrosin, and polysaccharide was detected by the use of Schiff's reagent as well as with aniline-diphenylamine in 95% ethanol.

Carbohydrate was determined by means of α-naphtol reagent after boiling the material in 1 N HCl for 2 hours. Lipid content was estimated after boiling the purified material in 1 N HCl for 30 minutes and extracting with chloroform-methanol mixture (2:1 v./v.). The dry weight of the extract was considered to indicate the amount of crude lipid. Total nitrogen was measured by a modified micro-Kjeldahl method, and total acetyl, total uronic acids and phosphorous were determined by known methods.

Further qualitative information on the composition of the purified antigen was obtained by paper chromatography using Whatman paper No. 1 and No. 4. Monosaccharide content was determined by one dimensional chromatography after hydrolysis of the sample in 2 N HCl for 2 hours, using iso-propanol-water (160:40 v./v.) as the solvent system. In looking for hexosamines, material which had been hydrolyzed with 2 N HCl for 2 hours and concentrated by vacuum evaporation was used. Chromatography was done, using both an n-butanol-pyridine-water (80:40:40 v./v.) solvent system and a pyridine-ethylacetate-acetic acid-water (5:5:1:3 v./v.) system. Elson-Morgan's reagent was employed for spot detection. Hexuronic acids were detected by aniline-diphenylamine reagent following chromatography of 2 N HCl hydrolysates in iso-propanol-pyridine-water (120:40:40 v./v.). Amino acids were identified after hydrolysis of the material in 6 N HCl at 121° C. for 12 hours. Two-dimensional chromatography was employed, using sec-butanol-formic acid-water (70:10:20 v./v.) followed by phenol-concentrated $NH_4OH$-water (80:0.3:20 v./w./v.) solvent. Sprayed ninhydrin was used for developing the chromatogram.

Both active and passive mouse protection tests were used to evaluate the protective activities of various fractions in this study. Groups of approximately 16 mice were used at each dosage level. Active immunization consisted of a single 0.25 ml. intraperitoneal injection of five-fold dilutions of the antigen to be tested. Two weeks after immunization the injected mice and appropriate non-immunized controls were challenged with the desired vibrios. The initial dilution of organisms harvested from heart-infusion agar medium was made with 0.1% gelatin-phosphate buffer saline, pH 7.4, and the final dilutions for injection into mice were prepared by making further 1:10 dilutions with 5% mucin suspension adjusted to pH 7.4. The challenge doses were prepared to contain an estimated 1,000 $LD_{50}$ doses, and the actual challenge strength was determined in each experiment by means of virulence tests. All animals were observed for 3 days after challenge, and the 50% effective immunizing dose ($ED_{50}$) in mcg. was calculated according to the method of Worcester & Wilson. In experiments where comparisons were desirable, a reference vaccine supplied by the National Institutes of Health of the United States was tested in parallel with the experimental antigens. The $ED_{50}$ doses of reference vaccines have been expressed in mcg. of dry weight, based upon the determination of the dialyzed dry weight of a fresh cholera organisms suspension (Ogawa 41) of equivalent optical density. Because of the tendency for lysis in the reference vaccines, this conversion from optical density to weight cannot be very exact, but whatever inaccuracies exist result in a conservative evaluation of the relative potency of the fractionated material.

In experiments where passive immunization was employed, mice received intraperitoneal injections of 0.25 ml. of five-fold dilutions of the immune serum to be studied and were challenged 4 hours later as in the active immunization experiments. The $ED_{50}$ amount of each immune serum was calculated as described above and has been expressed in the terms of the serum dilution.

Rabbits weighting about 2 lbs. were used in the preparation of immune serum. Antibacterial cell sera were prepared. Immune serum against the purified antigene was prepared by intravenous injections of 0.45 mg., 0.1 mg., 0.15 mg., 0.2 mg., and 0.5 mg. at 4 to 5 day intervals. Serum containing antibodies against the antigens in the second ammonium sulfate precipitate was prepared by giving subcutaneous doses of 0.1 mg., 0.2 mg., 0.5 mg., and 1.0 mg., followed by 4 subsequent doses of 2 mg. All sera were collected 7 days after the last immunizing dose and inactivated at 56° C. for 30 minutes. They were then either kept frozen or mixed with equal parts of glycerol and refrigerated at 2° C.

The immunodiffusion technique of Ouchterlony was employed for serological analysis. Varying ratios of antigen to antibody were used where evaluations of antigen purity were deduced from this procedure.

The vibriocidal activities of immune sera were estimated by a modification of the Neisser and Wechsberg method. Five-hour cultures of the appropriate vibrios were grown on heart infusion agar and harvested into 0.1% gelatin phosphate buffer saline, pH 7.4. The suspensions were adjusted to 170 Klett turbidity units by means of a Klett-Somerson photoelectric colorimeter (green filter), and a further 1:200 dilution was made. Lyophilized guinea pig complement was restored to its original volume with 0.85% saline and was then further diluted 1:2 with buffer. 0.2 ml. of serially diluted serum to be tested was placed in a series of previously cooled test tubes, and 0.1 ml. of complement and 0.2 ml. of cell suspension were added to each tube. After incubation in a water bath of 37° for one hour, 0.1 ml. aliquots of each mixture were spread on the surfaces of heart infusion agar plates that then were incubated overnight at 37°. Two or three plates were used for each tube, and the vibriocidal endpoint was considered to be the dilution of serum where no growth of organisms appeared on the plates.

The toxicities of the purified antigen or reference vaccines were determined by introperitoneal injections into mice and by interadermal injections in rabbits. Material for both of these tests was diluted with 8.5% lactose containing 0.01 M citrate buffer at pH 6.8. Injections into mice were made at 0.5 ml. volume, and intradermal doses were administered at 0.2 ml. The lethal dose for mice ($LD_{100}$) was the smallest dose that killed all mice, and the skin reactive dose (SRD) was considered to be the smallest amount of antigen which caused an area of erythema at least 5 mm. in diameter at 24 hours. For comparative purposes, a National Institutes of Health Ogawa reference vaccine and a commercial cholera vaccine were similarly tested. The toxicities of these vaccines are expressed in mcg. based upon a dry weight determination of non-dialyzable solids.

Mouse protection experiments demonstrated that phenol-water treatment of the ammonium sulface fraction, followed by chloroform-methanol treatment and ethanol precipitation between 30 and 60% resulted in a very high active material (Table 1).

Table 2 illustrates the recovery weights through the various steps of purification from the second ammonium sulfate precipitate (considered as 100%) to the final ethnol precipitation. It can be seen that with five lots of material, the amounts recovered at the various fractionation steps were quite consistent, and, with the exception of Lot #120 where temperature control was not adequate, the $ED_{50}$ for mice ranged between 0.02 and 0.06 mcg.

The ethanol fraction of Lot #142 was tested for homogeneity by ultracentrifugation, electrophoresis, and Ouchterlony gel diffusion. The ultracentrifugal Schlieren patterns obtained with the purified antigen showed a single peak, and calculations from the data obtained in this analysis indicated a sedimentation coefficient of approximately 100S.

Electrophoretic analysis gave negative tests for proteins when 100 mcg. of the purified antigen were applied to the starting line. A single band, reacting as carbohydrate, was detected about 1.5 cm. on the cathode side of the original point of application. Ultraviolet absorption studies showed no peaks over the range from 230 to 310 millimicrons. The lack of a peak or shoulder in the region of 260 millimicrons indicated that the antigen was not seriously contaminated with nucleic acids.

In Ouchterlony gel diffusion tests an antiserum prepared against the second ammonium sulfate precipitate was used. This serum produced at least 3 bands when tested against the crude ammonium sulfate antigen. The purified ethanol-precipitated antigen gave only a single band of precipitate with this complex serum under normal conditions of incubation. However, on prolonged incubation of more than 14 days a faint secondary band appeared to separate from this band and move a little closer to the serum well. Since alteration of the concentrations of either antigen or antiserum could not induce the formation of two bands during the normal incubation period, it has been concluded that the secondary band may represent antigen decomposition rather than the initial presence of two components.

The purified alcohol-precipitated antigen was subjected to various quantitative and qualitative chemical tests, the results of which are presented in Table 3. These data indicate that the main component of the antigen is carbohydrate with small amounts of nitrogenous substances and lipid being present. Chromatographic analysis after various methods of hydrolysis indicated that glucose, glucuronic acid, and glucosamine were the main carbohydrate components, and glutamic acid was the principal amino acid. However, one unidentified blue spot was found after spraying with aniline diphenylamine. It is believed that these results provide a basis for considering this antigen to be a lipopolysaccharide.

Since the antigen produced by the present process is prepared from an El Tor vibrio of the Ogawa subtype, mouse protection experiments were performed to determine its ability to protect against challenge infections with true cholera organisms. Table 4 presents two experiments showing the protective potency of the purified antigen against challenge with the Ogawa subtype of both the El Tor vibrio and *Vibrio cholerae*. The purified antigen was approximately equal in protective potency against both strains. In the second experiment in Table 4, a *V. cholerae* Ogawa reference vaccine was included for comparative purposes, and it may be seen that the $ED_{50}$ for the purified antigen is considerably smaller than for the bacterial vaccine. In other similar experiments where *V. cholerae*, Inaba 35A3 was used as the challenge strain, an $ED_{50}$ dose could not be attained, even when the immunizing dose was increased to 10 mcg. of purified antigen. It is therefore clear that the antigen obtained from the culture supernatat of El Tor 17 protects against the Ogawa subtype of either the El Tor or true cholera vibrios, but not significantly against the Inaba subtype. The sharing of this antigen between El Tor and *V. cholerae* Ogawa subtype organisms is further supported by Ouchterlony gel diffusion tests shown in FIG 4. Here purified antigens, prepared from Ogawa 41 of *V. cholerae* and El Tor strain 17 demonstrate a reaction of identity. A similar fraction prepared from *V. cholerae* Inaba 35A3, while reacting strongly with homologous Inaba antiserum gives only a very faint reaction with Ogawa serum.

Immune sera were prepared in rabbits by the injection of purified antigen and whole cell vaccines prepared from Strain El Tor 17 and Strain Ogawa 41. All of these sera were highly active in passive protection tests in mice and in vitro vibriocidal tests against *V. cholerae* Ogawa 41 (Table 5). The antibacterial sera also had good titers of "O" bacterial agglutinin. The anti-purified antigen serum (APA), however, displayed only a very poor agglutinating activity. The columns of Table 5 showing the activity of the antibacterial sera after absorption with purified antigen are of special interest. As might be expected, absorption almost eliminated passive protective activity and vibriocidal activity. However, the finding that purified antigen also absorbed "O" agglutinin activity when it did not seem to produce "O" agglutinin was an unexpected observation that has been repeated several times. The hapten-like behavior of the purified antigen in respect to "O" agglutinin is yet to be explatined.

The specificity of the vibriocidal action of the anti-purified antigen serum was compared to that of serum produced against Ogawa 41 whole cell vaccine (Table 6). Although the sera happened to be equally active in killing Ogawa 41 cells, the two sera are very different in respect to their activities against Inaba cells. The anti-purified antigen serum is highly Ogawa-specific, whereas the serum prepared against the whole cells shows a very significant degree of anti-Inaba action.

The alcohol precipitated purified antigen was tested for toxicity in terms of its lethal dose for mice and its skin-reactive dose in rabbits. In Table 7 this toxicity is compared with that of the NIH Ogawa reference vaccine and a commercial vaccine. The mouse protective $ED_{50}$ is also given for each of the three antigens, and an activity ratio representing the number of $ED_{50}$'s in one $LD_{100}$ or SRD is shown. On a dry weight basis the toxicity of the purified antigen is similar to that found for the whole cell vaccines. However, when antigenicity instead of weight is used as the basis for comparison, the purified antigen was found to be about 1/10 as toxic as whole cell vaccine in relation to its mouse protective activity.

It was observed very early in this program that freeze-drying from distilled water, saline, or phosphate buffer resulted in a decrease in mouse protective antigenicity and a loss of solubility (Table 8). This situation could be corrected by freeze-drying from 1% lactose solution. As seen in this same table, it also was found that 0.5% phenol had an adverse effect upon antigenicity. Purified antigen that had been freeze-dried from a solution containing 1% lactose and 0.5% phenol was examined by ultracentrifugal analysis and yielded the Schleiren patterns seen in FIG. 5. It is apparent that the antigen molecule is split into at least two smaller components by exposure to phenol during freeze-drying. Since the antigen in solution is relatively stable to 0.5% phenol and phenol treatment is part of its method of preparation, it is presumed that the relatively high cencentrations of phenol which may occur toward the conclusion of the freeze-drying process may be responsible for the decomposition that was noted.

The experiments in humans were performed with the practical antigen which had been prepared by dissolving the antigen in an isotonic solution consisting of 8.5% lactose, 0.01 M sodium citrate, and 0.5% phenol. The final antigen concentration was 50 mcg./ml., and the preparation was sterilized by filtration, using a Selas 02 filter, after which it was dispensed in 5 ml. quantities and held frozen at −60° until suitable sterility and safety tests were completed.

Nine persons, including 7 who had no known experience with cholera or cholera immunization, were chosen for these experiments. After a preimmunization bleeding, each person (except one) was given a dose of 25 mcg. of the antigen subcutaneously. One person (the first to be injected) received a 12.5 mcg. dose. Two weeks later all individuals received a second dose of 50 mcg. of the antigen. Bleedings were obtained 12 days after the first immunization, and 2 weeks, 6 weeks and 6 months after the second dose. All injections were given approximately at 9 o'clock in the morning, and each person recorded periodic observations of temperature until retiring. The day following each dose, a physician who was not otherwise involved in this program examined all persons for the evaluation of the occurrence of local or systemic reactions. Table 9 shows the highest temperature recorded by each of the subjects during the period of test and the time after injection that this temperature reading occurred. The highest temperature recorded by any subject was 100.2° F., which occurred as a single reading. All other temperatures, including those reported by this subject, were below 100° F. Neither the 25 mcg. dose nor the subsequent 50 mcg. dose produced important temperature responses in these persons, and there was no significant difference between the two doses in respect to the maximum temperature produced nor the time of its occurrence.

Table 10 gives an evaluation of the systemic and local reactions following the first and second doses of antigen. Although the number of injections in any group was not large, it was apparent that the practical antigen did not cause systemic illness or a high frequency of local reactions. The two local reactions to the practical antigen were both classified as moderated and consisted of slight edema at the site of the injections and slight pain associated with the movement of the injected arm. The reactions obtained with the commercial vaccine were in general more severe, and pain associated with the movement of the injected arm was quite prominent. It is of interest that volunteers Nos. 1 and 2, who had received cholera immunization previously, both had moderate or severe local reactions to commercial cholera vaccine several months before and after these experiments but failed to show such a reaction to the practical antigen.

Serological responses of all volunteers who had no previous known contact with cholera antigens are given in Table 11. Vibriocidal tests have been done on all but one serum, and it was apparent that there was a sizable vibriocidal antibody response even after the first dose. It is notable that these titers were not improved by the second dose and continued well above pre-immunization levels for at least six month. It most instances they appeared to be at about 1/4 of the peak titer. Passive immunization tests have been carried out with selected serum samples, and these results are also given in Table 11. Vibriocidal and passive immunization titers correlate very well. This has been interpreted to suggest the probability that the same antibody may be involved in both of these immunologic reactions.

Vibriocidal activity against *V. cholerae* Inaba 35A3 has been determined with 12 of the sera from 3 volunteers. All were essentially negative except of of the highest-titered sera obtained 12 days after the first immunization, and even here, only a 1:40 titer was found. This indicates that in humans, as previously noted in mice, the response to this antigen was quite specific for the Ogawa subtype.

Live bacterial antigen agglutination tests were performed using 6 human sera from 3 volunteers and 3 rabbit sera. The rabbit sera were obtained by immunization with purified lipopolysaccharide antigen, El Tor 17 vaccine, and *V. cholerae* Ogawa 41 vaccine, respectively. Table 12 compares the agglutinin titers of the sera with their vibriocidal titers. It can be seen that the agglutination titers were considerably lower than the vibriocidal titers and that the ratios between these two titers vary from 8 to 256.

It should now be apparent that the processes of the present invention in every way satisfy the objectives discussed above.

Changes to the above-described illustrative procedures may now be suggested to those skilled in the art without departing from the present inventive concept. Reference should therefore be had to the appended claims to determine the scope of this invention.

TABLE 1.—HOMOLOGOUS MOUSE PROTECTIVE POTENCY OF VARIOUS FRACTIONS FROM CULTURE SUPERNATANT OF EL TOR VIBRIO, STRAIN 17 (LOT 96)

| Fraction | $ED_{50}$, mcg. | $ED_{50}\pm1$ SD, mcg. | Relative protection |
|---|---|---|---|
| 20–30% Ammonium sulfate precipitate | 1.7 | 0.93–3.2 | 1.0 |
| Chloroform-methanol soluble | 42.2 | 21.7–79.0 | 0.040 |
| Chloroform-methanol insoluble | 0.25 | 0.12–0.52 | 6.8 |
| 10% Ethanol precipitate | 0.70 | 0.49–1.00 | 2.4 |
| 20% Ethanol precipitate | 0.27 | 0.18–0.39 | 6.2 |
| 30% Ethanol precipitate | 0.55 | 0.39–0.76 | 3.0 |
| 60% Ethanol precipitate | 0.046 | 0.017–0.12 | 36.9 |
| 80% Ethanol precipitate | 0.39 | 0.27–0.56 | 4.3 |

Challenge strain=El Tor vibrio strain 17, Ogawa subtype.
$LD_{50}$=1.2 cells.
Challenge dose=1,300 $LD_{50}$.

TABLE 2.—YIELD AND ACTIVITY OF PROTECTIVE ANTIGEN FROM CULTURE SUPERNATANTS OF EL TOR VIBRIO, STRAIN 17

| Fraction | Lot No. | | | | | | | | | |
|---|---|---|---|---|---|---|---|---|---|---|
| | 66 | | 96 | | 120 | | 142 | | 250 | |
| | Mg. | Percent | Mg. | Percent | Mg. | Percent | Mg. | Percent | Mg. | Percent |
| 20–30% Ammonium sulfate precipitate | 4,080 | 100 | 4,250 | 100 | -------- | -------- | 4,580 | 100 | 4,100 | 100 |
| Phenol-water soluble | 300 | 7 | 500 | 12 | 300 | -------- | 289 | 6 | 300 | 7 |
| Chloroform-methanol insoluble | 176 | 4 | 320 | 8 | 248 | -------- | 258 | 6 | 248 | 6 |
| 60% Ethanol precipitate | 112 | 3 | 64 | 2 | 83 | -------- | 135 | 3 | 216 | 5 |
| $ED_{50}$, mcg. of Ethanol precipitate | 0.021 | | 0.046 | | 0.15 | | 0.035 | | 0.057 | |

TABLE 3.—CHEMICAL COMPONENTS OF PURIFIED PROTECTIVE ANTIGEN

| Analysis | Quantitative Analysis, Percent |
|---|---|
| Total Nitrogen | 1.5 |
| Carbohydrate as Glucose | 60 |
| Lipids (crude) | 5 |
| Acetyl | 1.6 |
| Total Uronic acid as Glucuronic acid | 3.7 |
| Phosphorus | 0.7 |
| | Qualitative Analysis by Paper Chromatography |
| Monosaccharides | ++ |
| Glucose | − |
| Galactose | − |
| Arabinoce | − |
| Xylose | − |
| | Unidentified spot |
| Hexosamines: | |
| Glucosamine | + |
| Galactosamine | − |
| Hexouronic acids: Glucuronic acid | ++ |
| Amino acids: | |
| Glutamic acid | ++ |
| Tyrosine | + |
| Glycine | ± |
| Serine | ± |
| Hemoserine | ±? |

TABLE 4.—PROTECTIVE EFFECT OF A PURIFIED ANTIGEN (142-3) AGAINST EL TOR 17 (HOMOLOGOUS) AND OGAWA 41 (*V. CHOLERAE*) CHALLENGES

| Challenge strain | $LD_{50}$ dose | $ED_{50}$, mcg. | $ED_{50}\pm1$ SD, mcg. |
|---|---|---|---|
| El Tor 17 | 1,000 | 0.013 | 0.0068-0.024 |
| Ogawa 41 | 1,300 | 0.0094 | 0.0035-0.024 |
| El Tor 17 | 1,500 | 0.035 | 0.025-0.049 |
| Ogawa 41 | 2,000 | 0.012 | 0.0040-0.035 |
| | | [1] 0.70 | 0.50-0.97 |

[1] $ED_{50}$ of NIH Ogawa Reference Vaccine.

TABLE 5.—PASSIVE PROTECTIVE, VIBRIOCIDAL AND AGGLUTINATING ACTIVITIES OF RABBIT SERUM PREPARED AGAINST THE PURIFIED ANTIGEN AND AGAINST WHOLE BACTERIAL CELLS

| Test | APA [1] | Anti-bacterial cell serum | | | |
|---|---|---|---|---|---|
| | | El Tor 17, Ogawa subtype | | *V. cholerae*, Ogawa 41 | |
| | | Non-absorbed | Absorbed [2] | Non-absorbed | Absorbed [2] |
| Passive Protection ($ED_{50}$) | [3] 55,550 | 25,000 | 105 | 55,600 | 52 |
| Vibriocidal Activity | 25,000 | 12,500 | 20 | 25,000 | 20 |
| "O" Bacterial agglutination | 20 | 2,560 | <20 | 5,120 | <20 |

[1] Anti-purified antigen serum, No. 1.
[2] Absorbed with the purified antigen.
[3] Reciprocal of titers.

TABLE 6.—VIBRIOCIDAL ACTIVITY OF ANTI-PURIFIED ANTIGEN SERUM AND ANTI-SERUM PREPARED AGAINST WHOLE BACTERIAL CELLS OF *V. CHOLERAE*, OGAWA 41

| Serum | Vibriocidal titer against | |
|---|---|---|
| | Ogawa 41 | El Tor V 86 (Inaba) |
| APA [1] | 40,960 | 20 |
| Ogawa 41 "OH" | 40,960 | 5,120 |

Anti-purified antigen serum.

TABLE 7.—TOXICITY OF THE PURIFIED ANTIGEN COMPARED TO CHOLERA VACCINE

| Material | Mouse ip $LD_{100}$, mcg. | Rabbit SRD [1], mcg. | $ED_{50}$, mcg. | Activity ratio [2] | |
|---|---|---|---|---|---|
| | | | | $LD_{100}$ | SRD |
| Purified antigen Lot No. 142-3 | 1,250 | 50 | 0.035 | 36,000 | 1,400 |
| Ogawa vaccine (NIH) | | 150 | 0.7 | | 210 |
| Commercial vaccine | 2,500 | 75 | 0.7 | 3,600 | 110 |

[1] Skin Reactive Dose.
[2] Number of $ED_{50}$'s in one $LD_{100}$ or SRD.

TABLE 8.—THE EFFECTS OF SOLUTION COMPOSITION UPON THE FREEZE-DRYING OF PURIFIED ANTIGEN

| Lot No. | Challenge dose, $LD_{50}$ | Solution | Turbidity [1] | $ED_{50}$, mcg. |
|---|---|---|---|---|
| 175 | 1,000 | Distilled water | +++ | 2.11 |
| | | 1% lactose | − | 0.16 |
| 187 | 214 | Distilled water | +++ | 0.55 |
| | | 1% lactose | − | 0.14 |
| | | Distilled water 0.5% phenol | + | 1.00 |

[1] Restoration with distilled water. Challenge strain=*V. cholerae*, Ogawa 41.

TABLE 9.—MAXIMUM TEMPERATURE RESPONSE AND TIME OF OCCURRENCE FOR EACH VOLUNTEER RECEIVING PRACTICAL ANTIGEN.

| Volunteer | 1st dose 25 mcg. | | 2d dose 50 mcg. | |
|---|---|---|---|---|
| | Maximum temperature, F. | Time | Maximum temperature, F. | Time |
| 1 [1] | [2] 98.5 | [3] 7 | 98.6 | 3 |
| 2 [1] | 99.0 | 13 | 98.6 | 8 |
| 3 | 99.8 | 9 | 99.4 | 10 |
| 4 | 98.6 | 2 | 100.2 | 7 |
| 5 | 99.6 | 7 | 99.2 | 4 |
| 6 | 99.2 | 9 | 98.6 | 9 |
| 7 | 99.4 | 11 | 99.4 | 7 |
| 8 | 99.7 | 12 | 99.1 | 1 |
| 9 | 99.3 | 9 | 99.6 | 10 |
| Average | 99.23 | 8.78 | 99.18 | 6.56 |

[1] The persons who received immunization with commercial cholera vaccine before this study.
[2] Dose was 12.5 mcg.
[3] Hours after injection.

TABLE 10.—SIDE REACTIONS CAUSED IN HUMANS BY PRACTICAL ANTIGEN AND BY COMMERCIAL VACCINE

| Antigen | No. of injections | Systemic illness | Moderate to severe local reaction |
|---|---|---|---|
| Lot 2, 1st dose | 9 | 0 | 1 |
| Lot 2, 2d dose | 9 | 0 | 1 |
| Commercial cholera vaccine [1] | 38 | 6 | 11 |

[1] This vaccine was all from a single manufacturer, but represented several different lots.

TABLE 11.—SEROLOGICAL RESPONSES IN HUMANS IMMUNIZED WITH LOT NO. 2 PRACTICAL ANTIGEN

| Volunteer | Test | Time of bleeding | | | | |
|---|---|---|---|---|---|---|
| | | Pre-imm. | 12 days post I | 2 weeks post II | 6 weeks post II | 6 mos. post II |
| 3 | VC [1] | <10 | 640 | 320 | ---------- | 160 |
| 4 | VC | 20 | 5,120 | 5,120 | 2,560 | 640 |
| 5 | VC | 10 | 2,560 | 2,560 | 2,560 | 640 |
| | PI [2] | <20 | 4,350 | 2,000 | ---------- | ---------- |
| 6 | VC | 160 | 5,120 | 5,120 | 5,120 | ---------- |
| 7 | VC | 10 | 20,480 | 20,480 | 10,240 | 5,120 |
| 8 | VC | 640 | 5,120 | 5,120 | 2,560 | 1,280 |
| | PI | 356 | 3,850 | ---------- | ---------- | ---------- |
| 9 | VC | 20 | 20,480 | 20,480 | 10,240 | 2,560 |
| | PI | 25 | 14,700 | 6,250 | ---------- | ---------- |

[1] Vibriocidal test=Results expressed as reciprocal titers against *V cholerae*, Ogawa 41.
[2] Passive immunization=Results expressed as reciprocal titers for protection in 1.0 ml ($ED_{50}$) against *V. cholerae*, Ogawa 41.

TABLE 12.—COMPARISON OF VIBRIOCIDAL TITER AND AGGLUTINATION TITER USING LIVE *V. CHOLERAE*, OGAWA 41 ORGANISMS

| Serum | Vibriocidal titer | Live bacterial agglutination titer | Ratio [1] |
|---|---|---|---|
| Human volunteer: | | | |
| 3 B [2] | 640 | <20 | >32 |
| 3 C [3] | 320 | 20 | 16 |
| 8 B | 5,120 | 640 | 8 |
| 8 C | 5,120 | 320 | 16 |
| 9 B | 20,480 | 1,280 | 16 |
| 9 C | 20,480 | 1,280 | 16 |
| Rabbit: | | | |
| APA [4] | 40,960 | 160 | 256 |
| El Tor, 17, "OH" | 20,480 | 2,560 | 8 |
| *V. cholerae*, Ogawa 41, "OH" | 40,960 | 5,120 | 8 |

[1] The value of the ratio of vibriocidal titer to agglutination titer.
[2] 12 days post-immunization I.
[3] 2 weeks post-immunization II.
[4] Antiserum prepared with a purified lipopolysaccharide.

What is claimed is:

1. A process for the production and purification of Ogawa lipopolysaccharide cholera antigen comprising the steps of culturing a Vibrio selected from the group consisting of *V. cholerae* El Tor 17 Ogawa, *V. cholerae* Ogawa 41 and *V. cholerae* strain of Ogawa subtype in a liquid culture medium, then centrifuging the culture suspension and retaining the clear culture supernatant, then, under refrigerated conditions adding ammonium sulfate thereto, collecting and packing the flocculated material, then collecting and dissolving the precipitate and packed flocculated material in a phosphate buffer solution, then dialyzing the phosphate buffer solution and removing the precipitate, then adding ammonium sulfate to the resulting supernatant fluid and collecting the precipitate, then dissolving the precipitates in a phosphate buffer, adding lactose thereto to a final concentration of 1% lactose, then freeze-drying the resulting lactose containing ammonium sulfate precipitated antigen, then adding this antigen to a phenol-distilled water mixture with heating, then centrifuging this mixture with removal of the water layer, then adding lactose to a final concentration of 1% to the removed water layer, then freeze-drying the resulting lactose-containing antigen, then adding the resulting lactose-containing antigen to a chloroform-methanol mixture at −60° C., then bringing this mixture to room temperature and centrifuging the mixture with removal and discharging of the chloroform-methanol extract, then taking up the resulting sediment in cold distilled water, then centrifuging the resulting distilled water preparation and collecting the water supernatant and then adding lactose thereto to a final concentration of 1%.

2. A process as described in claim 1 including the additional steps of diluting the resulting solution to a desired antigen-solids concentration, filtering, then filling the diluted solution asceptically into final containers, then freeze-drying the filled containers and then sealing the containers under vacuum.

3. A process as described in claim 1 including the additional purification steps of adding absolute ethanol at −60° C. to said resulting distilled water preparation with stirring, then centrifuging the resulting mixture and discarding the collected precipitate, then adding chilled ethanol to the resulting supernatant then centrifuging the ethanol supernatant mixture and removing the alcohol-containing supernatant, then dissolving the resultant precipitate in cold distilled water and then adding lactose to a final concentration of about 1%.

4. A process as described in claim 3 including the steps of diluting the resulting solution to a desired antigen-solids concentration, filtering, then filling the diluted solution aseptically into final containers, then freeze-drying the filled containers and then sealing the containers under vacuum.

No references cited.

LEWIS GOTTS, *Primary Examiner.*

RICHARD L. HUFF, *Assistant Examiner.*

UNITED STATES PATENT OFFICE

CERTIFICATE OF CORRECTION

Patent No. 3,328,253 June 27, 1967

Yoshikazu Watanabe

It is hereby certified that error appears in the above numbered patent requiring correction and that the said Letters Patent should read as corrected below.

Column 1, lines 17 and 28, for "chlorea", each occurrence, read -- cholera --; column 6, line 35, for "weighting" read -- weighing --; line 37, for "antigene" read -- antigen --; line 75, for "interdermal" read -- intradermal --; line 22, for "ethnol" read -- ethanol --; column 8, line 14, for "supernatat" read -- supernatant --; line 44, for "serium" read -- serum --; column 10, line 8, for "month" read -- months --; line 18, for "of", first occurrence, read -- 2 --; column 11, TABLE 3, first column, line 10 thereof, for "Arabinoce" read -- Arabinose --; column 14, lines 17 and 18, for "discharging" read -- discarding --.

(SEAL) Signed and sealed this 18th day of June 1968.

Attest:

Edward M. Fletcher, Jr.
Attesting Officer

EDWARD J. BRENNER
Commissioner of Patents